(12) United States Patent
Gallet (10) Patent No.: US 8,596,975 B2
(45) Date of Patent: Dec. 3, 2013

(54) SIMPLIFIED SYSTEM FOR CONTROLLING PROPELLER BLADE PITCH IN AN AIRCRAFT TURBOSHAFT ENGINE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 608 days.

(21) Appl. No.: 12/993,485

(22) PCT Filed: May 26, 2009

(86) PCT No.: PCT/EP2009/056361
§ 371 (c)(1),
(2), (4) Date: Nov. 19, 2010

(87) PCT Pub. No.: WO2009/144217
PCT Pub. Date: Dec. 3, 2009

(65) Prior Publication Data
US 2011/0076143 A1    Mar. 31, 2011

(30) Foreign Application Priority Data
May 29, 2008  (FR) ...................................... 08 53501

(51) Int. Cl.
*B63H 3/10*  (2006.01)
*B64C 11/20* (2006.01)
*F01D 7/00*  (2006.01)

(52) U.S. Cl.
USPC .............. 416/26; 416/147; 416/149; 416/167

(58) Field of Classification Search
USPC .......... 416/26, 147, 149, 153, 154, 167, 205; 192/38, 44, 47
See application file for complete search history.

(56) References Cited

U.S. PATENT DOCUMENTS

| 2,252,544 | A  | * | 8/1941 | Jamieson ........................ 416/26 |
| 4,738,590 | A  |   | 4/1988 | Butler |
| 5,779,446 | A  |   | 7/1998 | Althof et al. |
| 7,189,182 | B2 | * | 3/2007 | Stevenson et al. ............ 475/292 |
| 8,496,098 | B1 | * | 7/2013 | Napau et al. .................... 192/15 |

FOREIGN PATENT DOCUMENTS

GB    2 194 991    3/1988

OTHER PUBLICATIONS

International Search Report issued Sep. 18, 2009 in PCT/EP09/056361 filed May 26, 2009.
U.S. Appl. No. 12/993,531, filed Nov. 19, 2010, Gallet.

* cited by examiner

*Primary Examiner* — Edward Look
*Assistant Examiner* — Christopher J Hargitt
(74) *Attorney, Agent, or Firm* — Oblon, Spivak, McClelland, Maier & Neustadt, L.L.P.

(57) ABSTRACT

A system for controlling pitch of a propeller blade of a turboshank engine, including two automatic locking members making it possible, depending on their controlled position, to lock rotation of a blade root in both directions of rotation, or to allow the rotation of the blade root support in either of the two directions.

10 Claims, 6 Drawing Sheets

SIMPLIFIED SYSTEM FOR CONTROLLING PROPELLER BLADE PITCH IN AN AIRCRAFT TURBOSHAFT ENGINE

TECHNICAL FIELD

The present invention generally concerns a system for controlling propeller blade pitch in an aircraft turboshaft engine.

The invention also concerns a propeller equipped with such a control system, as well as a method for steering said system.

The invention applies to all types of propeller, simple propellers or contra-rotating propellers, preferably for turbojet engines or turbo-props.

BACKGROUND OF THE INVENTION

A turbo-prop can be equipped with a pitch controlling system associated with each of the blades of its propeller, so as to adapt the orientation of the blades to the speed of the aircraft.

Such a system is designed such that the incidence of the blade remains fixed when the control system is not actuated, and must therefore make it possible to resist the action of the torque generated by the aerodynamic and centrifugal forces exerted on said blade during rotation of the propeller. More generally, to keep its pitch, it is considered that the blade must be locked in both directions of rotation along its own axis. To do this, the system is generally equipped with a locking mechanism, usually of the type ensuring contact/friction between two parts, such as a disc brake. To control the incidence of the blade, it is therefore necessary to perform a preliminary step for unblocking the incidence of the blade, by breaking the contact between the two parts of the locking mechanism.

Of course, the presence of the locking mechanism greatly complexifies the design of the control system, which creates drawbacks in terms of mass, reliability and bulk.

BRIEF DESCRIPTION OF THE INVENTION

The invention therefore aims to at least partially resolve the abovementioned drawbacks, relative to the embodiments of the prior art.

To that end, the invention first concerns a system for controlling the propeller blade pitch in a turboshaft engine, comprising:
  an annular part for housing the root of said blade, the rotation of which is intended to ensure setting of the incidence of said blade, said annular part defining a first track having at least first and second notches circumferentially spaced apart from each other and each delimited by a first stop surface in a first direction of the circumferential direction and by a second stop surface in a second direction of the circumferential direction, opposite said first direction;
  a second substantially annular track, concentric to said first track and positioned opposite and outside in relation thereto, said second stop surface of the first notch and said first stop surface of the second notch also each being oriented towards said second track;
  a member for actuating the annular part arranged between the first and second tracks, said actuating member having a first stop surface in the first direction of the circumferential direction as well as a second stop surface in the second direction of the circumferential direction;
  a first locking member provided between the first and second tracks, housed in said first notch and opposite said second stop surface of the actuating member; and
  a second locking member provided between the first and second tracks, housed in said second notch and opposite said first stop surface of the actuating member;
  said first and second locking members being able to occupy, during the operation of the turboshaft engine:
  a normal over-center position, in which said first locking member is on one hand in contact with the second stop surface of the first notch, at a distance from said first stop surface of said notch and from the second stop surface of the actuating member, and on the other hand in contact with the second track, position in which a first spring placed between said first stop surface of the notch and said first locking member causes a first contact stress of said second stop surface of the notch on the first locking member, and creating a first reaction stress of said second track on said first locking member, the first contact stress and the first reaction stress ensuring a first over-center of the first and second tracks, making them integral in rotation in the first direction,
  and in which said second locking member is on one hand in contact with the first stop surface of the second notch, at a distance from said second stop surface of said notch and from the first stop surface of the actuating member, and on the other hand in contact with the second track, position in which a second spring placed between said second stop surface of the notch and said second locking member causes a second contact stress of said first stop surface of the notch on the locking member, and creating a second reaction stress of said second track on said second locking member, the second contact stress and the second reaction stress ensuring a second over-center of the first and second tracks, making them integral in rotation in said second direction; and
    an unlocking position in said first direction, in which the first locking member is in contact with the second stop surface of the actuating member, this unlocking position being ensured by the application of a first actuating torque in said first direction on said actuating member, of a value making it possible to exert, on the first locking member with said second stop surface of the actuating member, a first unlocking stress opposing the force of the first spring, and sufficing to make said first bearing stress null, and thereby to break said first over-center, said unlocking position in the first direction allowing the rotational movement, in relation to the second track, in said first direction of the actuating torque, of the assembly including said first track, said first and second locking members and said actuating member; and
    an unlocking position in said second direction, in which the second locking member is in contact with the first stop surface of the actuating member, this unlocking position being ensured by the application of a second actuating torque in said second direction on said actuating member, of a value making it possible to exert, on the second locking member with said first stop surface of the actuating member, a second unlocking stress opposing the force of the second spring, and sufficing to make said second bearing stress null, and thereby to break said second over-center, said unlocking position in said second direction allowing the rotational movement, in relation to the second track, in said second direction of the actuating torque, of the assembly including said first track, said first and second locking members and said actuating member.

The invention is remarkable in that it allows automatic locking of the blade when no actuating torque is supplied to the actuating member, due to the over-center created by the first and second tracks, by the first and second locking members occupying their normal over-center position.

However, when it is necessary to change the pitch of the blade, a torque is applied with an appropriate value and direction on the actuating member, this torque making it possible both to unlock the system by placing the locking members in one of the two unlocking positions, and to drive the rotation of the first track in the desired direction, ensuring the setting of the blade's incidence. It should be noted that the unlocking and the rotation of the first track are caused simultaneously or practically simultaneously.

Thus, the pitch control system according to the invention has a simplified design in relation to those encountered in the prior art, since a single and same control makes it possible to ensure the unlocking and movement of the blade's incidence. No separate locking mechanism is therefore required, as was the case before, which creates advantages in terms of mass, reliability and bulk.

Lastly, the system according to the invention also procures high precision in the setting of the blade associated with this system.

Preferably, said first and second stop surfaces of the actuating member are also each oriented towards said first track. Because of this, the rotation of the first track ensuring the setting of the blade is easier, since the reaction stress of the second track on the locking member in contact with the actuating member is greatly reduced, if not eliminated. The resistance to the rotational movement of the first track is indeed decreased.

Preferably, the system comprises elastic return means coupled to said actuating member, and making it possible, when the latter is not subjected to said first actuating torque or said second actuating relative to said first track, so as to automatically bring said first and second locking members back into the normal over-center position.

Preferably, the system comprises an actuating engine controlling the rotation of said actuating member. It is therefore this engine that is intended to deliver the actuating torque causing the movement of the locking members in their unlocking position, as well as the rotation of the first track in relation to the second track.

Preferably, said first and second locking members are rollers. One alternative consists of providing that said first and second locking members are balls. In each of these cases, rolling members are therefore provided, which advantageously limits the friction in relation to that encountered in locking mechanisms of the disc brake type of the prior art.

Preferably, said first and second locking members form a pair of locking members, and the system is equipped with a plurality of pairs of locking members circumferentially spaced apart from each other. This allows a more homogenous distribution, in the circumferential direction, of the stresses ensuring the over-center of the first and second tracks. Moreover, in the normal over-center position, each locking member must therefore support compression stresses of lower intensity than those encountered in the single pair solution, which makes it possible in particular to improve the system's reliability.

The invention also concerns a propeller for an aircraft turboshaft engine comprising a pitch control system as described above, associated with each of the blades.

The invention also concerns an aircraft turbojet engine, comprising at least one propeller as described above.

The turbomachine preferably comprises a system of contra-rotating propellers, with each of its two propellers designed in the manner previously described, this turbomachine preferably being a turbo-prop, but alternatively able to be a turbojet engine. Naturally, in the latter case, the system of propellers is intended to form the fan of the turbojet engine.

Lastly, the invention also concerns a method for controlling a system for controlling propeller blade pitch in a turboshaft engine, as described above. According to this method, when an incidence change is required, a suitable actuating torque is applied to said actuating member.

Other advantages and features of the invention will appear in the non-limiting detailed description below.

BRIEF DESCRIPTION OF THE DRAWINGS

This description will be done in light of the appended drawings, which.

DETAILED DESCRIPTION OF PREFERRED EMBODIMENTS

Figure 1:
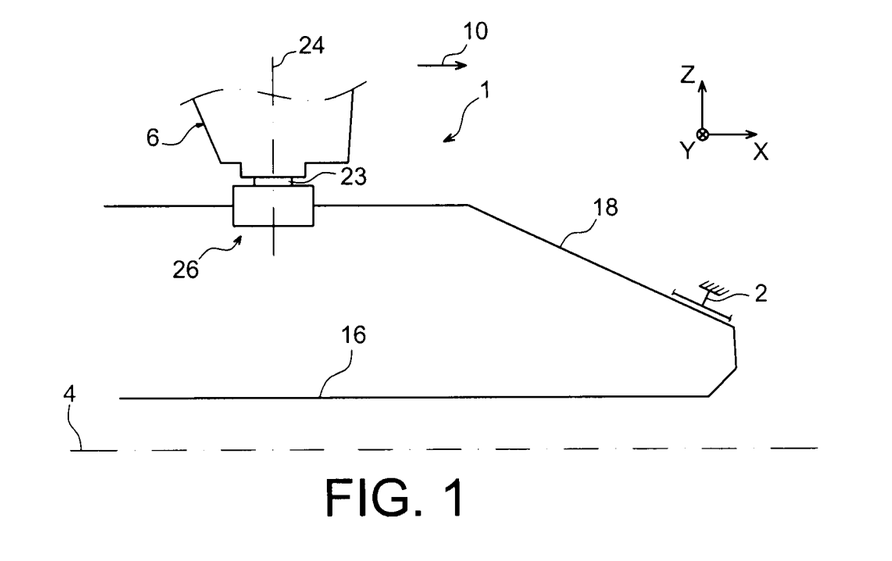
FIG. 1 is a diagrammatic longitudinal half-section view of a propeller part for an aircraft turboshaft engine, according to one preferred embodiment of the present invention.

FIG. 1 shows part of a propeller 1 of a turboshaft engine according to one preferred embodiment of the present invention, for example belonging to a system of contra-rotating propellers.

The X axis corresponds to the longitudinal direction of the propeller 1, this direction also corresponding to the longitudinal direction of the turbo-prop intended to integrate such a propeller 1. The Y axis corresponds to the transverse direction of the propeller 1, and the Z axis to the vertical direction or the height, these three axes being orthogonal to each other.

The propeller 1 comprises a stator or a casing 2, centered on a longitudinal axis 4, parallel to the X axis. This stator 2 is intended in a known manner to be integral with other casings of the turbomachine.

Moreover, a primary air flow direction through the propeller 1 is diagrammatically shown by arrow 10 parallel to the X axis, this primary air flow direction also serving as reference for the terms "upstream" and "downstream" used below.

For information, in the case of a system of contra-rotating propellers, the two propellers (only one being shown) are intended to rotate in opposite directions around the axis 4 on which they are centered, the rotations occurring in relation to the stator 2, which remains immobile.

The propeller 1 comprises a drive shaft 16 centered on the axis 4, and intended to be driven in rotation by a mechanical transmission device (not shown), for example forming an epicyclic gear train, itself driven by the turbine of the turbomachine. In the case of a pair of contra-rotating propellers, it is also possible for the latter parts to be driven directly by a contra-rotating turbine.

Figure 2:
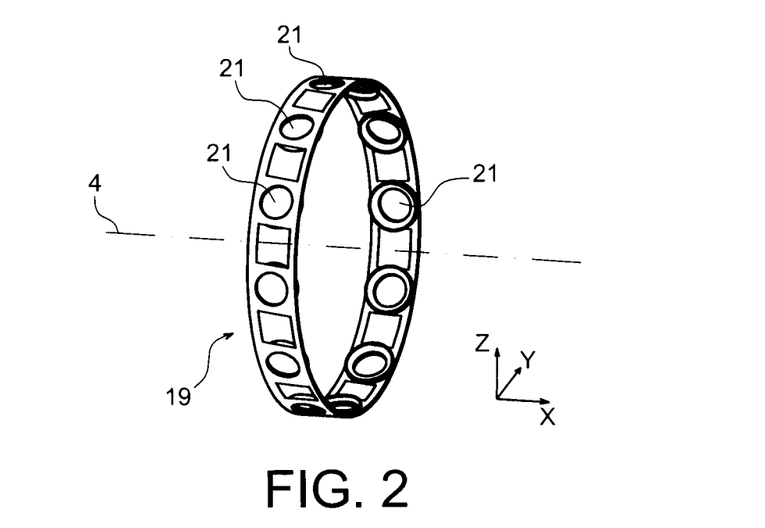
FIG. 2 is a perspective view of a retaining ring of the propeller blades of FIG. 1.

The hollow shaft 16 fixedly supports, at its downstream end, a rotor 18 housing, at its outer radial end, i.e. at its circumferential crown, propeller blades 6. More precisely, as shown in FIG. 2, the rotor 18 is equipped with a retaining ring of the blades 19, centered on the axis 4, and having a plurality of circumferentially spaced housings 21, each intended to receive a blade root, and being an integral part of a system for controlling the pitch of said blade.

The pitch control system 26, diagrammed in FIG. 1, makes it possible to move the blade 6 to which it is connected between a minimal incidence position and a maximal incidence position, in relation to the axis 4. The movement of the blade 6 between these two positions is done by pivoting thereof on itself, i.e. around its main axis 24, which also corresponds to the axis of the housing of the retaining ring in which the blade root 23 is inserted. Of course, each of the blades 6 of the propeller is equipped with its own pitch control system 26, the latter being steered preferably simultaneously so that each blade has, at any moment, the same incidence.

Figure 3:
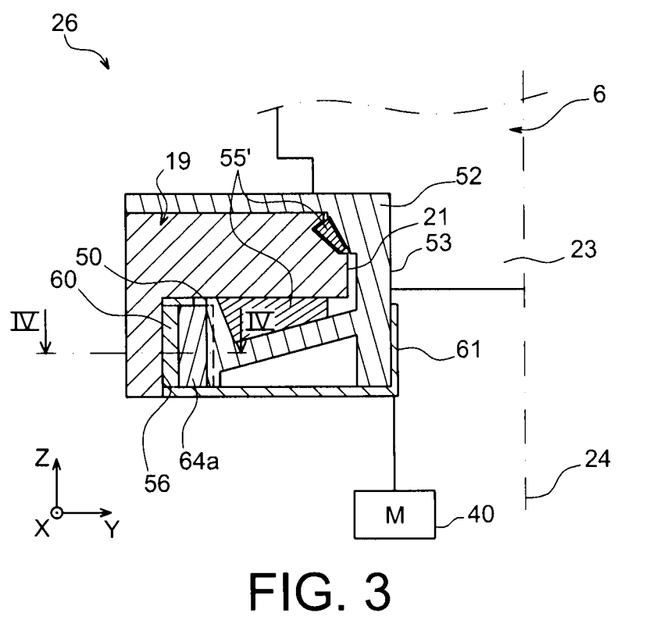
FIG. 3 is a detailed view of a system for controlling the pitch of a propeller blade of FIG. 1, in transverse half-section, and also corresponding to a half-section view along line III-III of FIG. 4.

A pitch control system 26, according to one preferred embodiment of the present invention, will now be described in reference to FIGS. 3 and 4.

It first comprises an annular part 52 for housing the root of the blade, centered on the axis 24, and having a central portion inserted freely rotating in the housing 21 of the retaining ring 19. Moreover, bearings 55', such as tapered roller bearings, are provided between the two parts, so as to facilitate the relative rotation between them, along the axis 24.

For example, the central portion of the part 52, also called pivot, itself has an inner bore 53 in which the blade root 23 is housed, integral therewith in rotation along the axis 24. Thus, the rotation of the part 52 is intended to ensure the rotation of the blade 6 along its axis 24, and therefore intended to ensure the setting of the incidence of said blade.

This part 52, which preferably constitutes the inner part of the control system centered on the axis 24, defines a first track 50 oriented radially outwardly, and substantially annular. It has first and second notches 54*a*, 54*b* radially open towards the outside and spaced apart from each other along a circumferential direction 55.

The first notch 54*a* is delimited by a first stop surface B1 in a first direction 55*a* of the circumferential direction 55, and by a second stop surface B2 in a second direction 55*b* of said direction, opposite the first direction. In cross-section orthogonal to the axis 24 as shown in FIG. 4, the surface B1, preferably planar, is preferably orthogonal to the local circumferential direction, i.e. the tangential direction. However, the surface B2, also preferably planar, is also oriented radially outwardly, its angle with the local circumferential direction preferably being between 5 and 85°, the value selected being chosen in particular as a function of the coefficient of friction of the materials present, to be able to create an over-center that will be described below.

The two surfaces B1, B2 are spaced circumferentially away from each other by a notch bottom.

The second notch 54*b* is defined by a first stop surface B'1 in the first direction 55*a* of the circumferential direction 55, and by a second stop surface B'2 in the second direction 55*b*.

Figure 4:
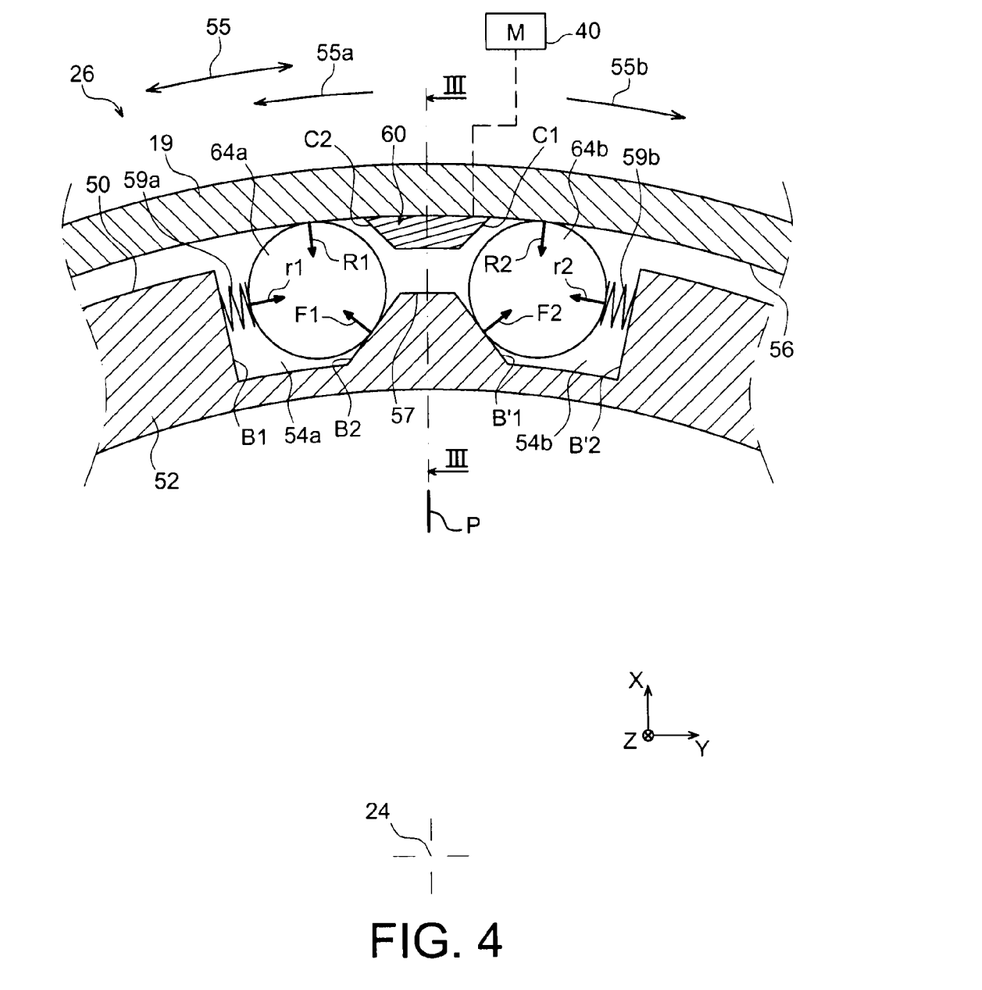
FIG. 4 is a detailed view of the system for controlling the pitch of a propeller blade along line IV-IV of FIG. 3, with the locking members of the system occupying their normal over-center position.

In cross-section orthogonal to the axis 24 as shown in FIG. 4, the surface B'2, preferably planar, is preferably orthogonal to the local circumferential direction. However, the surface B'1, also preferably planar, is also oriented radially outwardly, its angle with the local circumferential direction preferably being between 5 and 85°, the value selected here also being chosen as a function of the coefficient of friction of the materials present, to be able to create an over-center. The two surfaces B'1, B'2 are spaced circumferentially away from each other by a notch bottom.

The surfaces B2 and B'1 are situated back to back on a same outward radial protrusion 57 of the annular part 52, passed through by a radial symmetrical plane P passing through the axis 24. The notches 54*a*, 54*b* as well as their surfaces B1, B2, B'1, B'2 are indeed arranged on either side of the plane P, symmetrically in relation thereto, as shown in FIG. 4. As a result, in the second direction 55*b*, successively there is the surface B1, the notch bottom 54*a*, the surface B2, the surface B'1, the notch bottom 54*b*, then the surface B'2.

The system 26 also includes a second substantially annular track 56, also with axis 24 and arranged opposite and outwardly in relation to the first track 50, creating an annular space between them. This track 56, radially inwardly oriented, is provided on the retaining ring 19, away from and concentrically to the housing of the blade root 21.

Thus, the two surfaces B2 and B'1 are each substantially oriented towards this second track 56, due to their incline described above.

The system 26 also includes an actuating member 60 of the annular part 52, arranged between the first and second tracks 50, 56. This member 60 assumes the form of a lug integral with the outer radial end of a substantially annular plate 61, also with axis 24. It is preferably pivotably connected with the second track 56 on which it is preferably in contact, its plate 61 being connected to the rotor of an actuating engine 40, in order to be able to set in rotation by the latter, along the axis 24. To that end, it is noted that the engine 40 has a stator fastened on the rotor 18 of the propeller 1.

The actuating member 60 has a first stop surface C1 in the first direction 55*a*, as well as a second stop surface C2 in the second direction 55*b*.

In cross-section orthogonal to the axis 24 as shown in FIG. 4, the surface C2, preferably planar, is also oriented radially inwardly and towards the first notch 54*a*, its angle with the local circumferential direction preferably being between 5 and 85°. Likewise, the surface C1, preferably planar, is also oriented radially inwardly and towards the second notch 54*b*, its angle with the local circumferential direction also preferably being between 5 and 85°.

In the normal position shown in FIG. 4, which will be explained below, the surfaces C1 and C2 are also arranged back to back symmetrically in relation to the plane P, also corresponding to the plane of symmetry of the lug 60.

Moreover, a first locking member 64*a*, preferably in the form of a roller, is provided between the first and second tracks, housed in the first notch 54*a* and opposite the second stop surface C2 of the member 60. In the same way, a second locking member 64*b*, preferably in the form of a roller, is provided between the first and second tracks, housed in the second notch 54*b* and opposite the first stop surface C1 of the member 60.

FIG. 4 shows the control system 26 with the locking members 64*a*, 64*b* occupying, during the operation of the turboshaft engine, a normal over-center position.

In that position, the first locking member 64*a* is on one hand in contact with the second stop surface B2, away from the first stop surface B1 and the notch bottom, and on the other hand in contact with the second track 56. This position is in particular ensured by a first spring 59a, placed between the first stop surface B1 and the roller 64a. This spring 59a then exerts an action r1 on the roller 64a that tends to move the latter in the second direction 55b, until it comes into contact with the stop surface B2. The roller 64a therefore being stopped in rotation in this second direction 55b by the second stop surface B2, the latter then exerts a first contact stress F1 on the roller 64a.

This stress F1 creates a first reaction stress R1 of the second track 56 on the roller 64a. Thus, the first contact stress F1 and the first reaction stress R1 jointly ensure a first over-center of the first and second tracks, making them integral in rotation in the first direction 55a. In that respect, during operation of the turboshaft engine causing the rotation of the propeller, an aerodynamic force is exerted on the blades, and creates a torque of a given direction on the part 52, due to its mechanical connection to the blades. If the given direction corresponds to the first direction 55a, the part 52 will advantageously remain immobile in rotation in relation to the retaining ring 19, along the axis 24, since the torque applied to said annular part 52 will only strengthen the over-center procured by the roller 64a, by increasing the intensity of the stresses F1 and R1.

Still in the normal over-center position, the second locking member 64b is on one hand in contact with the first stop surface B'1, away from the second stop surface B'2 and the notch bottom, and on the other hand in contact with the second track 56. This position is in particular ensured by a second spring 59b, placed between the second stop surface B'2 and the roller 64b. This spring 59b then exerts an action r2 on the roller 64b that tends to move the latter in the first direction 55a. The roller 64b being stopped in rotation in this first direction 55a by the first stop surface B'1, the latter then exerts a second contact stress F2 on the roller 64b.

This stress F2 creates a second reaction stress R2 of the second track 56 on the roller 64b. Thus, the second contact stress F2 and the second reaction stress R2 jointly ensure a second over-center of the first and second tracks, making them integral in rotation in the second direction 55b. In this respect, during the operation of the turboshaft engine causing the propeller to rotate, if the direction given to the torque applied to the part 52, resulting from the aerodynamic force exerted on the blades, corresponds to the second direction 55b, the part 52 will advantageously remain immobile in rotation in relation to the retaining ring 19, along the axis 24, since the torque applied to said annular part 52 will only strengthen the over-center procured by the roller 64b, by increasing the intensity of the stresses F2 and R2.

This normal over-center position of the locking members 64a, 64b is kept while the engine 40 is not actuated, and prohibits any change to the incidence of the blade.

To vary the incidence of the blade, the system 26 must be steered in order to bring the rollers 64a, 64b into another so-called unlocking position in one or the other of the two directions 55a, 55b.

Figure 5A:
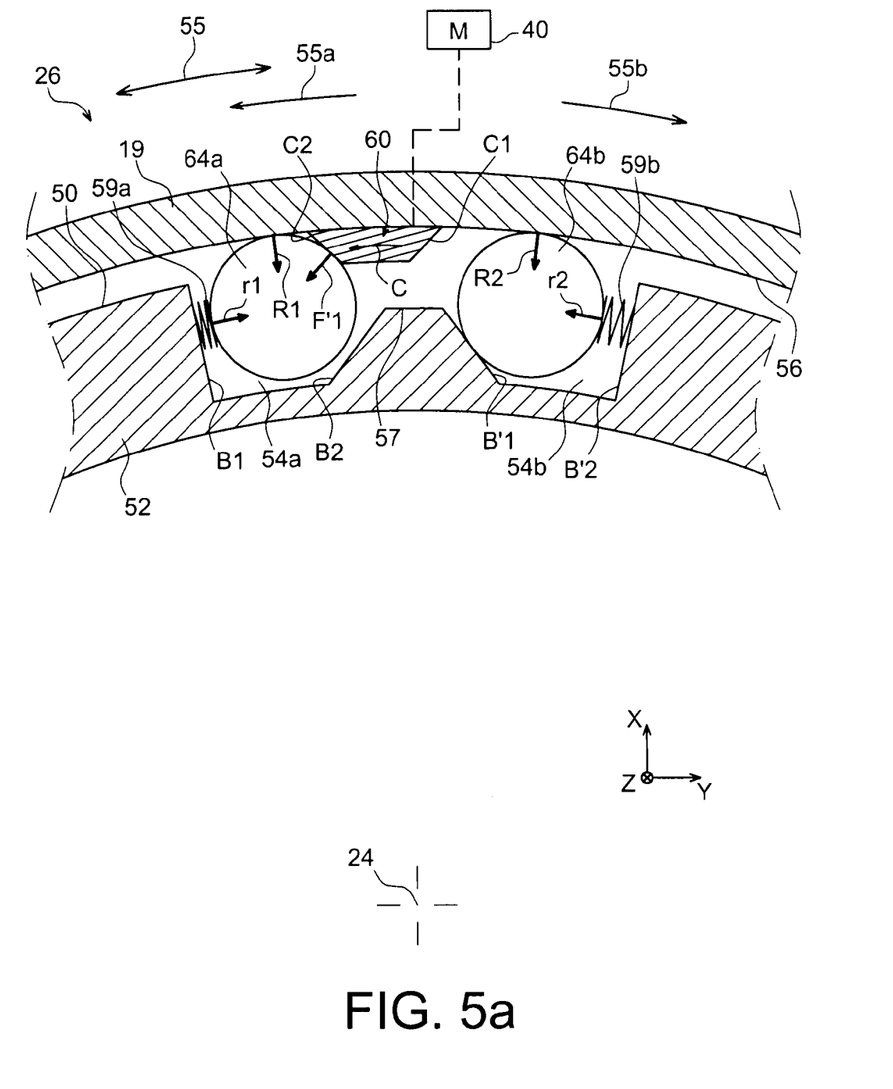
FIG. 5a shows a view similar to that of FIG. 4, with the locking members of the system occupying their unlocking position in the first direction, adopted during setting of the blade aiming to reduce the incidence thereof.

FIG. 5a concerns the case where the incidence of the blade must be modified towards its minimal incidence position.

In this unlocking configuration in the first direction, the roller 64a is brought into contact with the second stop surface C2. This position is ensured by the application of a first actuating torque C in the first direction 55a, on the actuating member 60, and more specifically on the plate 61 via the engine 40, driving the lug 60 to come into contact with the roller 64a. This torque C is of a value making it possible to exert, on the first roller 64a, with a second stop surface C2, a first unlocking stress F'1 opposing the force r1 of the first spring, aiming to compress the latter so as preferably to bring the roller 64a into contact with the surface B1. Generally, the unlocking stress F'1 is sufficient to make the first bearing stress F1 null. There is therefore a loss of contact between the roller 64a and the stop surface B2, such that the first over-center is broken. Possibly, due to the incline of the stop surface C2 towards the first track 50, the contact between the second track 56 and the roller 64a can also be broken, due to the tendency of that roller 64a to be raised by the stop surface C2.

This makes the reaction stress R1 null, and ensures gripping of said roller 64a between the compressing spring 59a and the surface C2. In this respect, as mentioned above, the compression of the spring can be such that the roller comes into contact with the stop surface B1. In the case where the contact between the second track 56 and the roller 64a is not broken, it is preferably done such that the reaction stress R1 is extremely low, allowing rolling and/or sliding between the two members.

This position makes it possible to set the part 52 in rotation in relation to the second track 56 of the retaining ring 19, along the axis 24, in the first direction 55a. It is indeed the assembly including the first track 50, the first and second locking members 64a, 64b, and the actuating member 60 that are simultaneously moved in rotation, under the effect of said member 60 driven by the torque C, by bearing of the roller 64a on the stop surface B1, possibly via the spring 59a. Moreover, it should be noted that this principle applies regardless of the direction of the torque applied to the annular part 52, resulting from the aerodynamic force exerted on the blade.

Moreover, it should be noted that the second over-center does not create an obstacle to the rotation of the pivot 52 in the first direction 55a, at least due to the fact that this rotation tends to eliminate the contact between the second roller 64b and the stop surface B'1, making the stress F2 null and therefore leading to breaking this second over-center. The roller 64b is then able to accompany the rotation of the pivot 52, by rolling and/or sliding on the second track 56 while remaining in its second notch.

Thus, the actuating torque C simultaneously makes it possible to unlock the system 26, and to cause the rotation of the pivot 52 in relation to the second track 56 of the retaining ring 19 of the rotor. This creates a variation of the pitch of the blade 6, from its maximal incidence position to its minimal incidence position.

Once the engine 40 is stopped, the control system 26 is automatically brought back into its configuration ensuring the normal locking position of the rollers 64a, 64b via elastic return means coupled to the actuating member 60, such as a spring (not shown). This spring in fact makes it possible to move said actuating member 60 in rotation in relation to the first track 50, so as to break the contact between the roller 64a and the surface C2. Simultaneously, the spring 59a pushes the roller 64a back on the stop surface B2, again ensuring the first over-center. In the same way, the spring 59b pushes the roller 64b back on the stop surface B'1, again ensuring the second over-center.

Thus, when the engine 40 is stopped, the pivot 52 keeps its angular position in relation to the second track, which ensures great pitch precision of the blade.

Figure 5B:
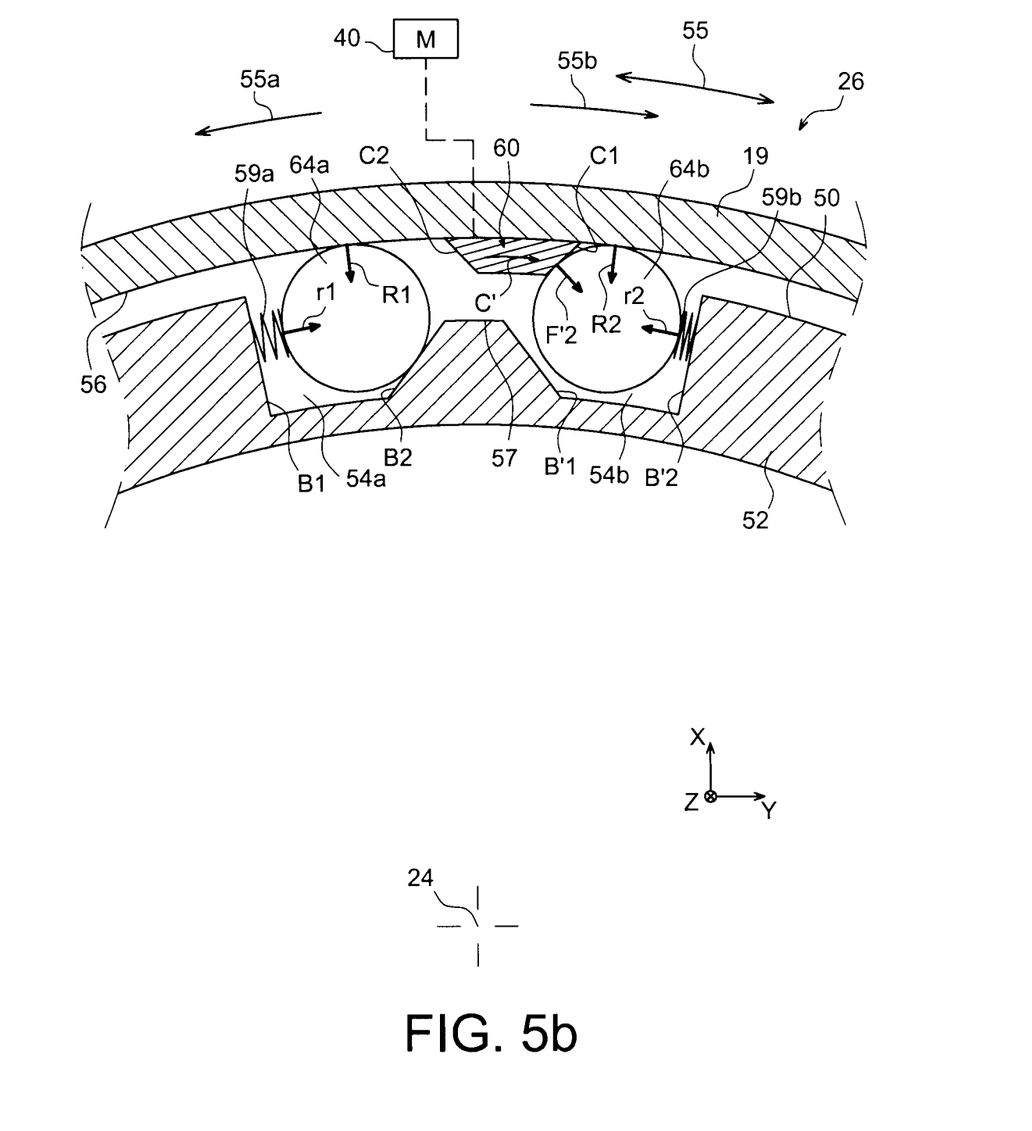
FIG. 5b shows a view similar to that of FIG. 5a, with the locking members of the module occupying their unlocking position in the second direction, adopted during setting of the blade aiming to increase the incidence thereof.

FIG. 5b concerns the case where the incidence of the blade must be modified towards its maximal incidence position.

In this unlocking configuration in the second direction 55b, the roller 64b is brought into contact with the first stop surface C1. This position is ensured by the application of a second actuating torque C' in the second direction 55b, on the actuating member 60, and more specifically on the plate 61 via the engine 40, driving the lug 60 to come into contact with the roller 64b. This torque C' is of a value making it possible to exert, on the second roller 64b, with the first stop surface C1, a second unlocking stress F'2 opposing the force r2 of the second spring, aiming to compress the latter so as preferably to bring the roller 64b into contact with the surface B'2. Generally, the unlocking stress F'2 is sufficient to make the second bearing stress F2 null. There is therefore a loss of contact between the roller 64b and the stop surface B'1, such that the second over-center is broken.

Possibly, due to the incline of the stop surface C1 towards the first track 50, the contact between the second track 56 and the roller 64b can also be broken, due to the tendency of that roller 64b to be raised by the stop surface C1.

This makes the reaction stress R2 null, and ensures gripping of said roller 64b between the compressing spring 59b and the surface C1. In this respect, as mentioned above, the compression of the spring can be such that the roller 64b comes into contact with the stop surface B'2. In the case where the contact between the second track 56 and the roller 64b is not broken, it is preferably done such that the reaction stress R2 is extremely low, allowing rolling and/or sliding between the two members.

This position makes it possible to set the part 52 in rotation in relation to the second track 56 of the retaining ring 19, along the axis 24, in the second direction 55b. It is indeed the assembly including the first track 50, the first and second locking members 64a, 64b, and the actuating member 60 that are simultaneously moved in rotation, under the effect of said member 60 driven by the torque C', by bearing of the roller 64b on the stop surface B'2, possibly via the spring 59b. Here again, it should be noted that this principle applies regardless of the direction of the torque applied to the annular part 52, resulting from the aerodynamic force exerted on the blade.

Moreover, it should be noted that the first over-center does not create an obstacle to the rotation of the pivot 52 in the second direction 55b, at least due to the fact that this rotation tends to eliminate the contact between the first roller 64a and the stop surface B2, making the stress F1 null and therefore leading to breaking this first over-center. The roller 64a is then able to accompany the rotation of the pivot 52, by rolling and/or sliding on the second track 56 while remaining in its first notch.

Thus, the actuating torque C' simultaneously makes it possible to unlock the system 26, and to cause the rotation of the pivot 52 in relation to the second track 56 of the retaining ring 19 of the rotor. This creates a variation of the pitch of the blade 6, from its minimal incidence position to its maximal incidence position.

Once the engine 40 is stopped, the control system 26 is automatically brought back into its configuration ensuring the normal locking position of the rollers 64a, 64b via elastic return means coupled to the actuating member 60, as well as via springs 59a, 59b, as described above.

Figure 6:
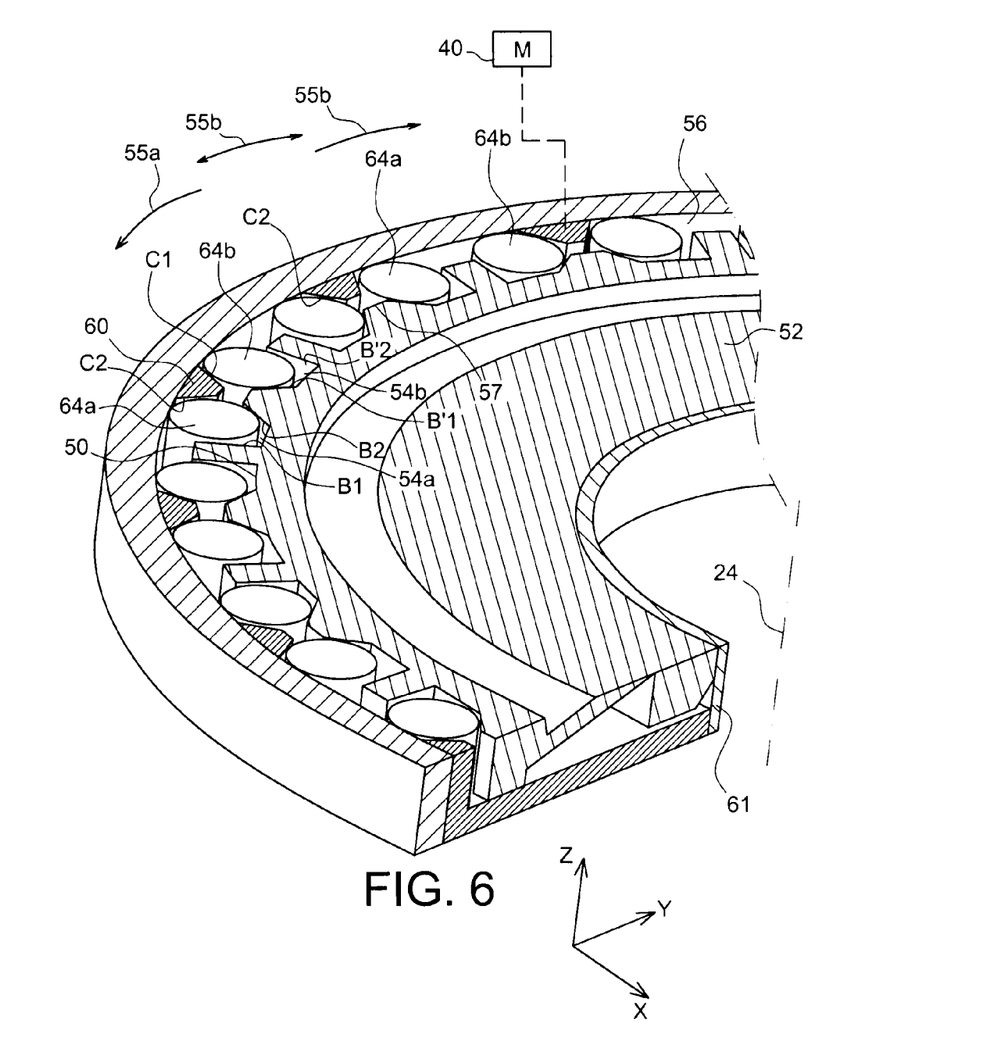
FIG. 6 is a perspective view of part of a setting system according to another preferred embodiment of the present invention.

According to one preferred embodiment of the present invention, several pairs of locking members 64a, 64b are provided, circumferentially spaced away from each other around the axis 24, as shown in FIG. 6. Preferably, these members 64a, 64b are arranged alternating, with, for each pair, an actuating member arranged between the two members 64a, 64b as described for the preceding preferred embodiment. Furthermore, these members 60, each in lug form, are integral with the plate 61 driven by the actuating engine (not shown in FIG. 6). This configuration allows a more homogenous overall distribution, in the circumferential direction, of the stresses ensuring the over-center of the first and second tracks.

Moreover, it should be noted that although the locking members 64a, 64b are preferably rollers, and the stop surface C1, C2 with which they cooperate are preferably substantially planar surfaces, one alternative embodiment may consist of providing that the locking members 64a, 64b are balls, and the surfaces C1, C2 substantially spherical surfaces.

Of course, various changes can be made by a person skilled in the art to the invention just described, solely as non-limiting examples.

The invention claimed is:

1. A simplified system for controlling propeller blade pitch in an aircraft turboshaft engine, comprising:

an annular part for housing a root of the blade, rotation of which is intended to ensure setting of incidence of the blade, the annular part defining a first track including at least first and second notches circumferentially spaced apart from each other and each delimited by a first stop surface in a first direction of the circumferential direction and by a second stop surface in a second direction of the circumferential direction, opposite the first direction;

a second substantially annular track, concentric to the first track and positioned opposite and outside in relation thereto, the second stop surface of the first notch and the first stop surface of the second notch also each being oriented towards the second track;

an actuating member that actuates the annular part arranged between the first and second tracks, the actuating member including a first stop surface in the first direction of the circumferential direction and a second stop surface in the second direction of the circumferential direction;

a first locking member provided between the first and second tracks, housed in the first notch and opposite the second stop surface of the actuating member; and a second locking member provided between the first and second tracks, housed in the second notch and opposite the first stop surface of the actuating member;

the first and second locking members configured to occupy, during operation of the turboshaft engine:

a normal over-center position, in which the first locking member is in contact with the second stop surface of the first notch, at a distance from the first stop surface of the notch and from the second stop surface of the actuating member, and in contact with the second track, a position in which a first spring placed between the first stop surface of the notch and the first locking member causes a first contact stress of the second stop surface of the notch on the first locking member, and creating a first reaction stress of the second track on the first locking member, the first contact stress and the first reaction stress ensuring a first over-center of the first and second tracks, making them integral in rotation in the first direction, and the second locking member is in contact with the first stop surface of the second notch, at a distance from the second stop surface of the notch and from the first stop surface of the actuating member, and in contact with the second track, a position in which a second spring placed between the second stop surface of the notch and the second locking member causes a second contact stress of the first stop surface of the notch on the locking member, and creating a second reaction stress of the second track on the second locking member, the second contact stress and the second reaction stress ensuring a second over-center of the first and second tracks, making them integral in rotation in the second direction; and an unlocking position in the first direction, in which the first locking member is in contact with the second stop surface of the actuating member, this unlocking position being ensured by application of a first actuating torque in the first direction on the actuating member, of a value making it possible to exert, on the first locking member with the second stop surface of the actuating member, a first unlocking stress opposing the force of the first spring, and sufficing to make the first bearing stress null, and thereby to break the first over-center, the unlocking position in the first direction allowing the rotational movement, in relation to the second track, in the first direction of the actuating torque, of the assembly including the first track, the first and second locking members and the actuating member; and an unlocking position in the second direction, in which the second locking member is in contact with the first stop surface of the actuating member, the unlocking position being ensured by application of a second actuating torque in the second direction on the actuating member, of a value making it possible to exert, on the second locking member with the first stop surface of the actuating member, a second unlocking stress opposing the force of the second spring, and sufficing to make the second bearing stress null, and thereby to break the second over-center, the unlocking position in the second direction allowing the rotational movement, in relation to the second track, in the second direction of the actuating torque, of the assembly including the first track, the first and second locking members and the actuating member.

2. The control system according to claim 1, wherein the first and second stop surfaces of the actuating member are also each oriented towards the first track.

3. The control system according to claim 1, further comprising elastic return means coupled to the actuating member, and making it possible, when the actuating member is not subjected to the first actuating torque or the second actuating torque, to move the actuating member in rotation relative to the first track, so as to automatically bring the first and second locking members back into the normal over-center position.

4. The control system according to claim 1, further comprising an actuating engine controlling the rotation of the actuating member.

5. The control system according to claim 1, wherein the first and second locking members include rollers.

6. The control system according to claim 1, wherein the first and second locking members include balls.

7. The control system according to claim 1, wherein the first and second locking members form a pair of locking members, and the system comprises a plurality of pairs of locking members circumferentially spaced apart from each other.

8. A propeller for an aircraft turboshaft engine comprising a pitch control system according to claim 1, connected to each of its blades.

9. An aircraft turbomachine comprising at least one propeller according to claim 8.

10. A method for steering a system for controlling the pitch of a turboshank engine propeller blade according to claim 1, wherein when it is necessary to set the incidence, a suitable actuating torque is applied to the actuating member.

* * * * *